(Model.)

F. WINSLOW.
STEAM KETTLE.

No. 250,864. Patented Dec. 13, 1881.

Witnesses:
Henry Chadbourn.
F. Allen.

Inventor:
Freeman Winslow.
by
Alban Andrew.
atty.

UNITED STATES PATENT OFFICE.

FREEMAN WINSLOW, OF SALEM, MASSACHUSETTS.

STEAM-KETTLE.

SPECIFICATION forming part of Letters Patent No. 250,864, dated December 13, 1881.

Application filed March 8, 1880. (Model.)

*To all whom it may concern:*

Be it known that I, FREEMAN WINSLOW, a citizen of the United States, residing at Salem, in the county of Essex and State of Massachusetts, have invented certain new and useful Improvements in Steam-Kettles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in steam-kettles, and applies more particularly to kettles for heating and boiling volatile liquids the gases of which are dangerous either as inhaled by the operators or on account of their combustive nature, such as, for instance, benzine, naphtha, alcohol, &c.; and my invention has for its object to heat or boil such volatile or nauseous liquids either singly or compounded with other liquids or ingredients—as, for example, the mixture of benzine and gutta-percha used for making water-proof cements—and allowing but a small percentage of the volatile liquid to escape by evaporation from the kettle, thus preventing the work-room from being filled with noxious and explosive or easily combustible gases.

The invention also has for its object to enable the mixing and stirring of the contents of the kettle without removing the cover, and thereby to prevent the escape of the volatile gases, for which purposes my improved kettle is constructed as follows, reference being had to the accompanying drawings, on which—

Figure 1:
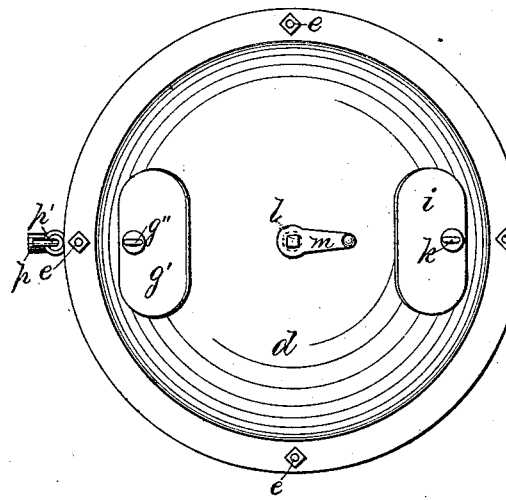
Figure 3:
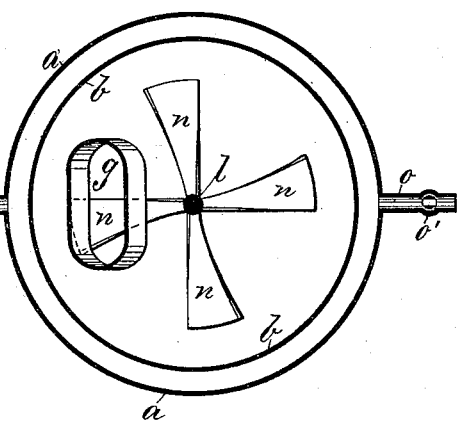
Figure 2:
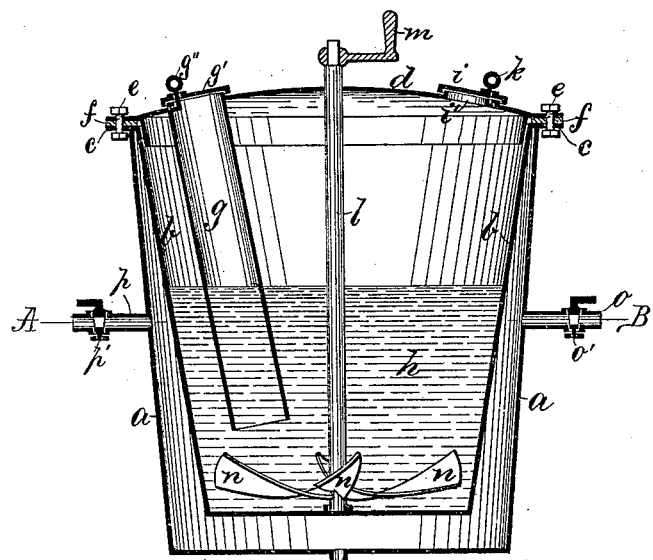

Figure 1 represents a plan view of the kettle. Fig. 2 represents a central longitudinal section;
and Fig. 3 represents a cross-section on line A B, Fig. 2.

Similar letters refer to similar parts wherever they occur on the different parts on the drawings.

*a* is the outer case or vessel, into which steam is introduced, as usual, for heating or boiling the liquid contained in the kettle *b*, as shown. The case *a* and the kettle *b* are united at their upper ends, and there provided with a flange, *c*, to which the cover *d* is secured by means of suitable screws, *e e e e*, as shown.

*f* is a packing-ring located between the cover *d* and flange *c*, so as to obtain a close connection between them and prevent all escape of gases at such place.

Attached to the cover *d* is a tube or well, *g*, that projects down into the liquid *h*, in which its lower end should be at all times sealed— that is, the liquid within the kettle *b* should never be allowed to stand lower than the open lower end of the tube or well *g*, but should always be above it, as shown in Fig. 2. This tube or well *g* serves as a receptacle into which the brush used by the operator is dipped to take up a portion of the liquid cement; and it will thus be seen that the area or horizontal section of the well or tube *g* is all the surface of the liquid that is exposed to the atmosphere in the work-room. Evaporation, of course, takes place all over the surface of the liquid in the kettle; but, with the exception of the amount exposed in the tube or well *g*, all such evaporation is condensed within the air-tight upper part of the kettle *b*, and again returned in a liquid state, thus effecting a great saving of the volatile part of the compound as compared with the ordinary way of heating or boiling within open-mouthed vessels.

To more effectually prevent evaporation and loss, I provide the upper end of the tube or well *g* with a hinged cover, *g'*, which may be folded down and held in a closed position by means of a suitable lock or fastening device, *g''*, whenever the operator is not at work.

Only one well or tube, *g*, is shown in the drawings; but where two or more persons are to use one and the same kettle I provide the latter with two or more tubes or wells, as may be required. *i* represents a hinged cover over an inlet-opening, *i'*, in the cover of the kettle *b*, through which opening the kettle can be filled from time to time, after which the cover *i* is closed upon such opening by means of a suitable lock or fastening device, *k*, as shown in Fig. 2, to prevent escapement of gases at this point.

*l* is a vertical shaft resting loosely in a bearing in the bottom of the kettle *b*, and having its upper end loosely projecting upward through the cover *d*, and provided above it with a crank, *m*, as shown.

*n n n n* are radial arms or wings attached to the shaft $l$, and at a point between its lower end and the lower end of the well or tube $g$, so that the said wings or arms may be turned around within the contents of the kettle by manipulating the crank $m$ without coming in contact with said well or tube $g$. By means of the device $l\ m\ n\ n\ n\ n$, as shown and described, the contents of the kettle $b$ can easily be stirred and thoroughly mixed without any exposure to the atmosphere, and consequently without loss by evaporation.

$o$ is a steam-inlet pipe to the outer case, $a$, as usual, and $p$ is a cold-water pipe for the purpose of admitting cold water to reduce the temperature of the contents of the kettle, as may be desired. $q$ is an outlet at the bottom of steam-case $a$ for condensed water.

$o'\ p'\ q'$ are valves or cut-offs respectively on the pipes $o\ p\ q$, as shown.

What I wish to secure by Letters Patent, and claim, is—

1. The inner vessel provided with one or more wells for the insertion of a brush or brushes, and with a removable cover, in combination with an outer heating-vessel, substantially as and for the purpose described.

2. The steam-boiler provided with close-fitting top or lid $d$, having one or more wells, as at $g$, projecting downwardly therefrom, and the vertical shaft $l$, having the radial stirring-arms $n$ arranged below said well or wells, and suitable means for operating said shaft from the exterior of the vessel, substantially as and for the purpose set forth.

In testimony whereof I have affixed my signature in presence of two witnesses.

FREEMAN WINSLOW.

Witnesses:
GEORGE HOLMAN,
THOMAS F. HUNT.